Figures 1, 4:
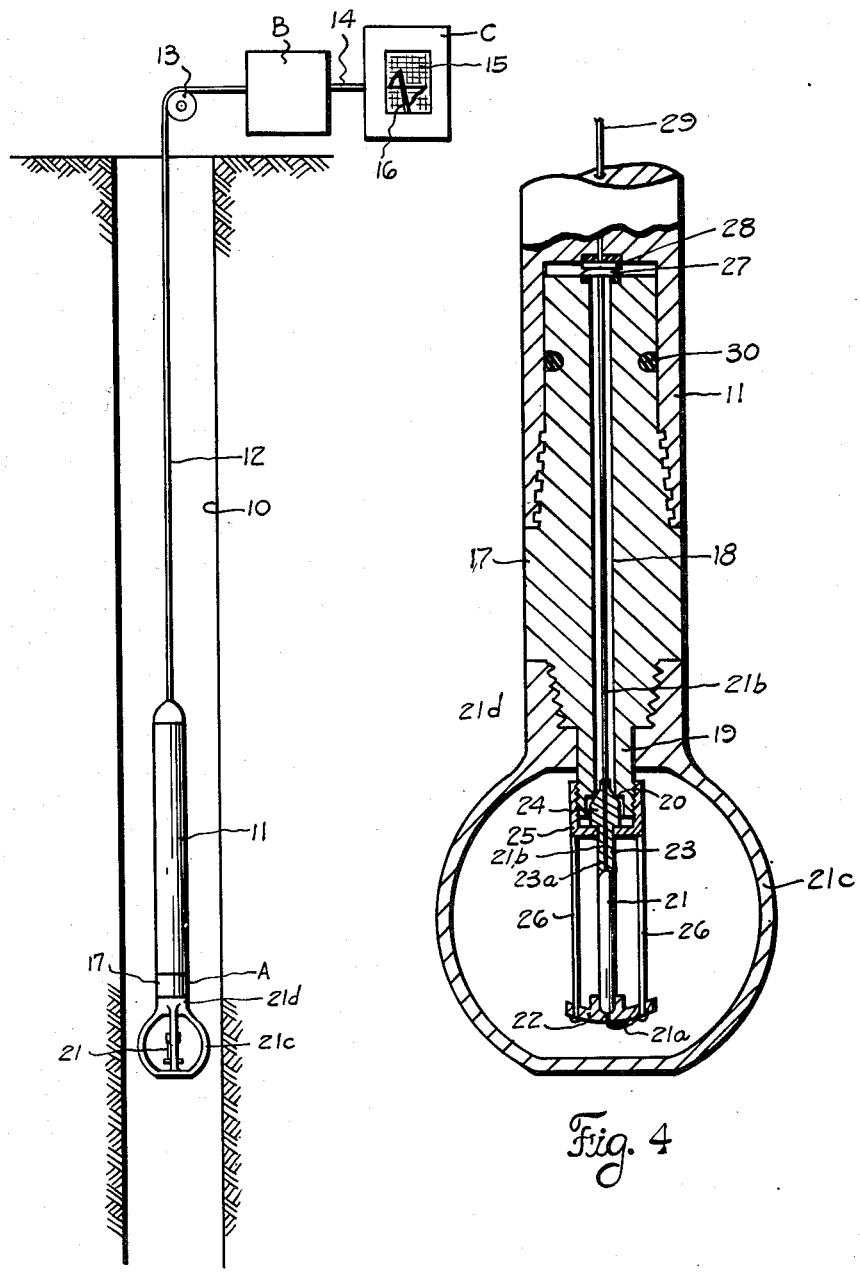

Aug. 25, 1953 R. W. GOBLE 2,649,715
TEMPERATURE MEASURING AND INDICATING APPARATUS
Filed May 8, 1947 2 Sheets-Sheet 1

Ralph W. Goble
INVENTOR.

BY Jou E. Edwards

ATTORNEY

Aug. 25, 1953     R. W. GOBLE     2,649,715
TEMPERATURE MEASURING AND INDICATING APPARATUS
Filed May 8, 1947     2 Sheets-Sheet 2
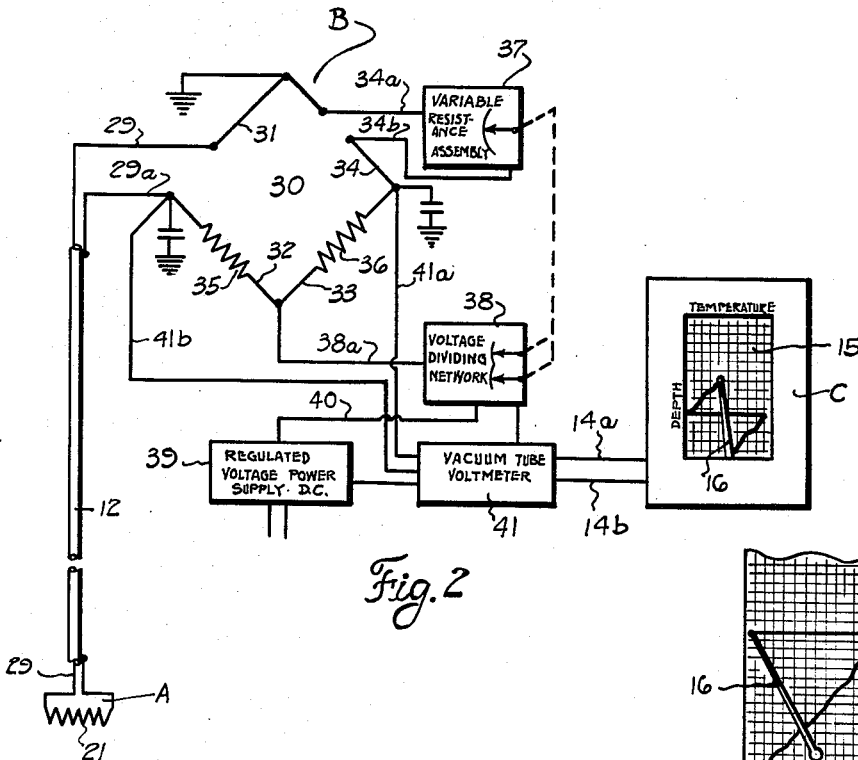
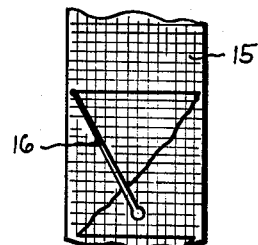
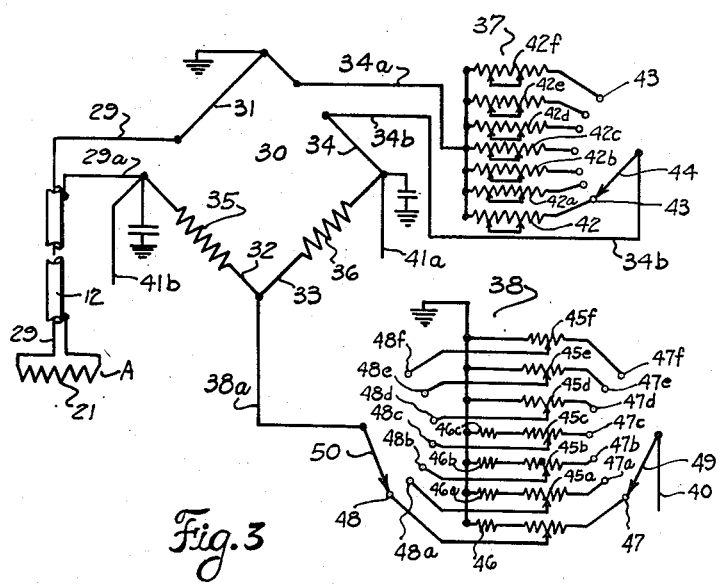
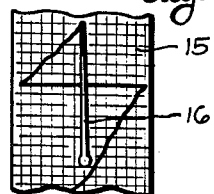
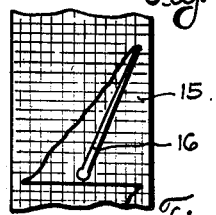
Ralph W. Goble
INVENTOR.
BY Jol E. Edwards
ATTORNEY Patented Aug. 25, 1953

2,649,715

UNITED STATES PATENT OFFICE 2,649,715

TEMPERATURE MEASURING AND INDICATING APPARATUS

Ralph W. Goble, Long Beach, Calif., assignor to Eastman Oil Well Survey Company, Denver, Colo., a corporation of Delaware Application May 8, 1947, Serial No. 746,667

3 Claims. (Cl. 73—362)

This invention relates to new and useful improvements in temperature measuring and indicating apparatus.

One object of the invention is to provide an improved temperature measuring and indicating apparatus having means for continuously recording temperature variations, whereby said apparatus is particularly adapted for use in measuring and recording the temperatures within a well bore.

An important object of the invention is to provide an improved temperature measuring and indicating apparatus having a measuring unit which is adapted to be lowered within a well bore so as to traverse the same, together with indicating means at the well surface electrically connected with and actuated by the measuring unit, whereby as the measuring unit traverses the well bore, the temperature present within said bore is continuously indicated at the surface on said indicating means.

Another object of the invention is to provide an improved temperature measuring and indicating apparatus, of the character described, wherein the measuring unit which is lowered within the well bore is electrically connected in a Wheatstone bridge circuit located at the well surface and also wherein said Wheatstone bridge circuit is, in turn, electrically connected to a continuous recorder mechanism, whereby the variation occurring in the bridge circuit and caused by the variations in well bore temperature affecting the measuring unit are visibly recorded at the surface.

A further object of the invention is to provide an improved apparatus, of the character described, and including a recording mechanism comprising a movable chart and a marking element, with the latter being controlled in accordance with variations in the bridge circuit as caused by variations in well bore temperatures; said apparatus also including electrical means for dividing the operating range of the apparatus into stages of predetermined limits, whereby the marking element traverses the chart during each stage and thereby makes it possible to amplify the indications to provide more accurate and detailed information which is more easily read and interpreted.

Still another object of the invention is to provide an improved temperature apparatus, of the character described, wherein a recording stylus which is controlled by the variations in the temperature being measured is movable transversely across a recording chart; said apparatus having means for dividing the entire operating range thereof into stages with each stage being recorded by the movement of the stylus completely across the chart, whereby the recording of temperature changes is amplified and is more easily determined and interpreted than would be the case if one transverse movement of the stylus across the chart covered the entire operating range.

A still further object of the invention is to provide a temperature indicating and recording apparatus, of the character described, having electrical means for balancing out the bridge measuring circuit at the beginning of each stage into which the entire operating range is divided, whereby the recording stylus is returned to starting position at the beginning of each stage and subsequently functions to record the temperature changes within that stage by its movement completely across the chart; said apparatus also having means for moving the stylus the same distance per degree of temperature change throughout all stages of the entire operating range of the apparatus.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a schematic view of a well bore illustrating the measuring unit of the temperature apparatus, constructed in accordance with the invention, lowered within said bore with the indicating and recording mechanism being shown located at the surface, Figure 2 is a block wiring diagram of the apparatus, Figure 3 is a detailed wiring diagram of the Wheatstone bridge measuring circuit, together with the variable resistance circuit and voltage dividing network associated therewith, Figure 4 is a transverse, vertical sectional view of the measuring unit which is lowered within the well bore, Figure 5 is an enlarged view of a portion of the recording chart, illustrating the recording stylus in its starting position thereon, Figure 6 is a similar view, with the stylus in an intermediate position with respect to the chart, and Figure 7 is a view, similar to Figures 5 and 6, and showing the recording stylus at the end of its movement relative to the chart.

In the drawings, the numeral 10 designates a well bore which extends downwardly through the sub-surface strata from the ground surface. A temperature measuring unit A, which will be hereinafter described in detail, is arranged to be lowered within the well bore and said unit is connected to the lower end of a sinker or lowering bar 11. The sinker bar is attached to the lower end of a conductor cable 12 and said cable functions to suspend or support the measuring unit assembly and at the same time provides an electrical connection between the unit A and the surface equipment. The cable extends upwardly to the surface and passes over a suitable pulley 13 in the derrick (not shown) and has electrical connection with a receiving and measuring unit B. The unit B has electrical connection through a conductor 14 with a recorder C.

The recorder is of standard construction and may be any suitable electrical recording mechanism, said recorder being preferably a GE photoelectric recorder, type No. 8CE2CK27. The recorder includes a movable tape 15 which is adapted to be traversed by a marking stylus 16. Although it is preferable that the above identified GE recorder be employed, it is pointed out any suitable electrically-actuated recording mechanism may be used.

The measuring unit A which is lowered within the well bore is, of course, affected by the temperature changes occurring within said bore. As will be explained, these temperature changes acting upon unit A are transposed into electrical measurements which are conducted to the receiving unit B at the surface. The electrical measurements will, of course, vary proportionately to the temperature changes or variations acting upon the unit A and said measurements are employed to operate the electrically-actuated recorder C. Thus, the stylus of the recorder C is moved across the recording tape 15 in direct ratio or proportion to the temperature changes which are encountered by the measuring unit A and therefore, said stylus will accurately indicate and record the well bore temperature acting upon the measuring unit A. The movable chart 15 is synchronized in its movement with the movement of the measuring unit A being lowered so that the elevation within the well bore at which the temperature changes occur is accurately indicated.

The physical construction of the measuring unit A is subject to variation and one form of said unit is illustrated in Figure 4. As shown in this figure, the unit includes a mandrel or support 17 which has its upper portion connected to the lower end of the sinker bar 11 and which has an axial bore 18 extending entirely therethrough. The lower end of the mandrel is formed with a reduced sleeve 19 which has the extreme lower end of its bore counter-bored to provide an internal annular shoulder or seat 20. A thermistor 21, which is actually an electrical resistance, has its lower end supported upon a plate 22, while its upper end is confined in the recessed underside of a cylindrical retaining member 23. The retaining member is formed with a conical head 24 at its upper end which head is adapted to be engaged with the seat 20 within the sleeve 19 of the mandrel 17. The head 24 is secured in a seated position by a retaining collar 25 which threads onto the sleeve 19. The retaining collar 25 is suitably fastened to the supporting plate 22 by vertically extending rods 26 which connect the parts together. In this manner when the retaining collar 25 is tightened to urge the head 24 into its seated position, the supporting plate 22 is pulled upwardly at the same time to thereby maintain the thermistor 21 in its supported position. The thermistor assembly is protected against damage as it is lowered and raised through the bore by a protective cage 21c which has a collar 21d at its upper end threaded onto the lower end of the mandrel 17.

The thermistor has one side grounded through a wire 21a to the supporting plate 22. The other side thereof has lead-out wire 21b which extends upwardly through an axial bore 23a formed in the cylindrical retaining member 23 and thence upwardly through the bore 18 of the mandrel. The wire 21b has its upper end electrically connected to a contact 27 provided in the top of the mandrel. This contact is engaged with a contact 28 carried by the sinker bar 11 and a conductor 29 extends upwardly through the sinker bar and thence through the conductor cable 12 to the surface. The joint formed between the sinker bar 11 and the mandrel 17 is packed off by a suitable packing ring 30 which is confined within an external groove in the upper portion of the mandrel and which engages the bore of the sinker bar.

The thermistor or electrical resistance 21 is, as will be explained, connected in the electrical circuit of the receiving unit B and as said thermistor is lowered through the well bore, it is, of course, subjected to the temperature present within said bore. The variation in temperature will result in a variation in electrical resistance properties of the thermistor and the change in said resistance will be directly proportional to the temperature changes encountered. Since the thermistor has electrical connection with the receiving unit B, the variations in its electrical resistance are utilized to actuate the recorder and in this manner a visual indication of the temperature within the well bore may be obtained.

The receiving unit B which is located at the surface and its electrical connection to the measuring unit A, which includes the thermistor 21, is clearly shown in Figures 2 and 3. The measuring unit includes a Wheatstone bridge circuit 30 which has four legs 31, 32, 33 and 34 which are arranged in the usual manner. Fixed resistances 35 and 36 are connected in the two legs 32 and 33, respectively, of the bridge circuit while the thermistor or electrical resistance 21 is connected in the leg 31 through the conductor 29 and through a conductor 29a which extends from the exterior supporting sheath of the cable and which is, of course, the ground side of the circuit. Obviously, the resistance 21 is variable in accordance with the particular well bore temperature acting thereon as said resistance is lowered through said bore. The fourth leg 34 of the Wheatstone bridge circuit has connection through wires 34a and 34b with a variable resistance assembly 37. As will be explained, the assembly 37, together with a voltage dividing network 38 which has connection through a wire 38a with the Wheatstone bridge 30, functions to divide the range over which the apparatus operates into various stages or scales.

Power is supplied to the unit B by a suitable power supply 39 which is preferably a regulated voltage D. C. supply. A conductor 40 extends from the power supply 39 to the voltage dividing network 38 and thence to the bridge circuit through the wire 38a. A vacuum tube voltmeter 41 has connection through wires 41a and 41b with the Wheatstone bridge circuit 30, the connection being such as to apply any differential occurring across the bridge circuit to the voltmeter. Wires 14a and 14b which are within the connecting conductor 14 electrically connect the voltmeter to the recorder C. In this manner the differential which is applied to the voltmeter and which is the direct result of any variation in the value of the thermistor or resistance 21, as affected by temperature, is utilized to control the movement of the marking stylus 16 across the recording tape 15 of the recorder C.

In employing the apparatus for measuring well bore temperatures, it is necessary that said apparatus operate over a relatively wide range since the temperature within well bores may vary from 0° F. to possibly 350° F. or higher. The physical limitations of the width of the recording chart 15 make it almost impossible to record this wide range of temperatures by the single movement of the stylus completely across the chart. In other words, because the chart is relatively narrow in width, it is not practical that one width of the chart represent the full operating range of the apparatus because if this were so, the temperature changes recorded would be so minute as to be substantially unreadable. In order to accurately indicate small temperature variations, it is desirable that the operating range be divided into stages or scales, with each stage or scale being representative of a certain number of degrees within the operating range. As a matter of illustration, it will be presumed that the operating range of the apparatus will be from 0° F. to 350° F. It will be further presumed that for most accurate and best indication, this operating range should be divided into seven equal stages each representative of 50° F. temperature. This means that the first stage will cover 0° F. to 50° F., the second 50° F. to 100° F., the third 100° F. to 150° F., etc. During each stage, the recording stylus 16 will move from the starting point or left hand side of the recording chart 15 (Figure 5) completely across said chart to the right hand side thereof (Figure 7).

For the purpose of dividing the operating range into the required plurality of stages or scales so that an amplified or exaggerated recording or indication may be obtained, the variable resistance assembly 37 and the voltage dividing network 38 are provided. The wiring diagram of this portion of the receiving unit B is clearly shown in Figure 3. The variable resistance assembly 37 includes a plurality of resistances 42, 42a, 42b, 42c, 42d, 42e and 42f, each of these resistances being representative of one stage or scale in the operating range. The resistances 42 to 42f are variable and are adjusted to a predetermined or desired degree in accordance with the value of which the thermistor 21 under the different temperature conditions at the beginning of each stage or scale and each has associated therewith an electrical contact 43 which is adapted to be engaged by a manually operated switch 44. The switch is connected through the wire 34b to the leg 34 of the Wheatstone bridge circuit while the resistances are also connected through the wire 34a to said leg. The first resistance 42 would be adjusted to cover the first range 0° F. to 50° F., the second resistance 42a is adjusted to represent the second stage 50° F. to 100° F. and the remaining resistances are adjusted to successively represent the 50° F. stages in the remainder of the operating range. It will be apparent that the manual switch 44 may be adjusted to connect any one of the resistances in the Wheatstone bridge circuit 30. It will be evident that since the resistances 42 to 42f are of predetermined values, and are set in accordance with or equal to the value of the resistance 21 at those temperatures which begin each stage or scale, it is possible to balance out the Wheatstone bridge circuit to zero at those selected points in the operating range where the value of one of the resistances 42 to 42f equals the value of the thermistor.

The voltage dividing network 38 controls the voltage which is applied to the Wheatstone bridge circuit and as will be explained, this voltage must be changed each time that the manual switch 44 is adjusted to change the particular resistance which is connected in the bridge circuit and thereby vary the voltage applied to the bridge. The network 38 includes a plurality of variable resistances 45, 45a, 45b, 45c, 45d, 45e and 45f, each of which are representative of one stage or scale in the operating range and each of which is adjusted to a predetermined value. The resistances 45 to 45c, inclusive, have associated therewith fixed resistances 46 to 46c, respectively. The variable resistances 45 to 45f, inclusive, have connection with contacts 47 to 47f, respectively, and are also connected to contacts 48 to 48f, respectively. The contacts 47 to 47f are adapted to be engaged by a manually controlled switch arm 49 while a similar switch arm 50 is arranged to engage the contacts 48 to 48f. The supply wire 40 which leads from the power supply 39 is electrically connected to the switch arm 49 while the conductor 38a extends from the switch arm 50 to the Wheatstone bridge circuit 30. It will be apparent that by moving the switch arms 49 and 50 any desired resistance may be connected to the Wheatstone bridge circuit to supply a predetermined voltage thereto.

The resistances 45 to 45f are representative of the successive scales or stages into which the operating range is divided and each has a value which relates to the voltage drop which occurs across the bridge under certain temperature conditions. Because opposite sides of the resistances are connected to the two sets of contacts 47 to 47f and 48 to 48f, the switches 49 and 50 must be actuated simultaneously to properly connect the desired resistance in the circuit. Since the voltage drop across the bridge in any one stage is different than that occurring in other stages, even though each stage covers the same number of degrees in temperature change, the voltage applied during each stage must vary. Also, the voltage applied to the bridge circuit must be varied as the resistance in the leg 34 of the bridge is varied by movement of the switch 44 and therefore, it is desirable that all three switch arms 44, 49 and 50 be actuated simultaneously. In the actual construction of the unit, these three switch arms may be mounted on a single shaft or interconnected in such a manner that the operation of one will result in the simultaneous operation of all three.

The variable resistance assembly 37 having resistances of predetermined values may be utilized to balance out the Wheatstone bridge circuit to zero in accordance with the values thereof. When the bridge circuit is balanced out, which is always at the beginning of one of the stages in the operating range, the voltage drop across the bridge is zero and the differential voltage applied to the vacuum tube voltmeter is zero whereby at this time, the marking stylus 16 is returned to zero or starting position on the recording chart 15, such position being shown in Figure 5. Thus, it might be said that the assembly 37 controls the bottom limits of the particular stages or scales in the operating range.

The voltage dividing network is provided to control the top limit in each stage or scale of the operating range. In other words, unless the voltage applied to the Wheatstone bridge is controlled, the stylus might complete its movement across the chart before the actual upper limit in degrees of temperature is reached. The necessity for providing the variable voltage supply to the bridge circuit is due to the fact that the voltage drop across the bridge in one stage is different from the voltage drop across said bridge during the other stages, even though all stages represent the same number of degrees. In order to maintain proper movement of the stylus across the chart so that it will always reach the limit of its movement (Figure 7) on said chart at the top of each stage, the voltage differential applied to the voltmeter must be maintained substantially the same during each stage. However, as explained, this differential will vary during different stages because the voltage drop across the bridge 30, caused by the thermistor encountering varying well bore temperatures, will be different in one stage than in another. It is, therefore, necessary to apply the predetermined voltage to the bridge through the network 38 during each stage to compensate for the variable differential which would normally be applied and in this manner the differential applied to the voltmeter 41, which actuates the recording stylus 16, is maintained substantially the same throughout all stages in the operating range. The provision of the network 38 actually sets the upper limit of each stage or scale and assures that the stylus will reach its limit of travel on the chart (Figure 7) at the upper temperature limit of each stage or scale.

In the operation of the apparatus, it will be presumed that the operating range extends from 0° F. to 350° F. and that the variable resistance assembly 37 and the voltage dividing network 38 divide this range into seven stages or scales, each of which cover 50° F. of temperature. Prior to the lowering of the measuring unit into the well bore, the manual switch arms 44, 49 and 50 are adjusted to connect one of the stage resistances 42 to 42f in the bridge circuit. Assuming the surface temperature to be 50° F., the apparatus would be adjusted to begin operation in the second stage. This means that the switch arm 44 is engaged with the contact 43 of the second stage resistance 42a in the variable resistance assembly 37, whereby the resistance 42a is electrically connected in the leg 34 of the bridge circuit. The resistance 42a has been predeterminately adjusted to exactly balance the value of the resistance or thermistor 21 at a temperature of 50° F., which resistance is connected in the leg 31 of the Wheatstone bridge; this results in balancing the bridge and with no voltage drop thereacross, a zero voltage differential is applied to the vacuum tube voltmeter 41 through the wires 41a and 41b, whereby the stylus 16 is moved to its zero or starting position relative to the chart 15, as shown in Figure 5. Such starting position is, of course, representative of 50° F. because the apparatus is set for the beginning of the second stage or scale in the operating range.

At the same time that the switch 44 was moved to connect the second stage resistance 42a in the bridge circuit, the switch arms 49 and 50 of the voltage dividing network were connetcted to the contacts 47a and 48a whereby the second stage resistance 45a of this network controls the application of a predetermined voltage to the bridge circuit to assure proper control of the movement of the stylus across the chart.

The apparatus is now ready for operation and the measuring unit A is lowered downwardly through the well bore 10. As the temperature within the well bore is encountered by the thermistor 21, such temperature acts upon the thermistor and results in a change in the electrical resistance thereof. Since this resistance is connected in one leg 31 of the Wheatstone bridge it will be apparent that the voltage drop across the bridge circuit and the voltage differential being applied to the vacuum tube voltmeter will vary in accordance with the changes occurring in said resistance. The variation of voltage drop across the bridge circuit, as affected by the variation in temperature acting upon the resistance, is in direct proportion or ratio to the change in temperature and thus the voltage differential applied to the vacuum tube voltmeter will be directly proportional to the temperature change. It is the differential in voltage which is applied to the vacuum tube voltmeter which causes the stylus to move across the chart 15 to indicate the temperature which is encountered by the thermistor 21 as it moves downwardly through the well bore.

As the temperature increases from 50° F. to 100° F., the stylus 16 is moved across the recording chart 15 and at 100° F. reaches the position shown in Figure 7 so that the stylus has completely traversed the chart during this stage or scale in the operating range which, as has been noted, is the second stage. It will be presumed that during the temperature change from 50° to 100°, and with the voltage applied through the resistance 45a, a differential of five volts voltage drop across the bridge occurred. This five volt differential, as applied to the vacuum tube voltmeter, has caused the stylus to completely traverse the width of the chart. It is at this time that the apparatus must be adjusted to the starting positions of the next or third stage in the operating range which obviously begins at 100° F. temperature.

The adjustment to the next or third stage in the range is accomplished by manually moving the switch arms 44, 49 and 50 to engage these arms with the resistances which define said third stage or scale in the operting range. The switch 44 engages the contact 43 of the resistance 42b of the variable resistance assembly 37 so that said resistance 42b is connected in the leg 34 of the Wheatstone bridge. At the same time, the switch arms 49 and 50 engage the contacts 47b and 48b, respectively, to connect the resistance 45b in the circuit which applies voltage to the bridge circuit. The resistance 42b of the assembly 37 has been adjusted to a predetermined value and exactly balances the value of the thermistor 21 at 100° F. temperature, whereby the bridge is balanced; balancing of the bridge eliminates a voltage drop thereacross with the result that the stylus 16 is moved back to its zero or starting position relative to the recording chart 15 (Figure 5). The stylus remains at this point until the temperature acting upon the thermistor 21 increases to change the value of said thermistor and again unbalance the bridge and thereby cause movement of the stylus across the chart in the manner hereinbefore described. It will be obvious that the starting or zero position of the stylus at the beginning of the third stage is representative of 100° F.

The connection of the resistance 45b of the voltage dividing network which controls application of a different voltage to the bridge circuit is necessary to limit the movement of the stylus as it moves across the chart during the subsequent or third stage. As was presumed, a change in temperature from 50° F. to 100° F. with the voltage applied through resistance 45a in the second stage resulted in a five volt differential across the bridge circuit, which differential was applied to the vacuum tube voltmeter and resulted in the stylus moving the width of the chart. During the third stage which covers the range from 100° F. to 150° F., it has been found that the voltage differential or drop across the bridge circuit will vary, as compared to the second stage, unless the applied voltage is changed; in other words if the applied voltage remains the same, instead of a five volt drop across the bridge over the first 50° F. temperature change, the second 50° F. temperature change, that extending from 100° F. to 150° F., will result in a different differential or drop across the bridge circuit. This would cause the stylus to move a greater or lesser distance with respect to the width of the chart and thus in order to control or limit the movement of the stylus in its travel to the right hand edge of the chart, as shown in Figure 7 upon the 150° F. temperature being reached, the resistance 45b of the voltage dividing network is adjusted to apply a proper voltage to the bridge network which will maintain the required five volt drop across the bridge at the end of the third stage. Thus, as the temperature changes from 100° F. to 150° F., actually only a five volt differential is applied to the vacuum tube voltmeter during this interim so that the stylus reaches the edge of the chart when the 150° F. temperature is indicated. Thus, it becomes obvious that because the voltage drop across the bridge is different during each stage or scale, even though each scale or stage represents only a 50° F. range, it is necessary to control the voltage applied to the bridge in order to set the top limit of movement of the stylus in each range.

As the temperature acting upon the thermistor reaches 150° F., the stylus has reached its limit of movement (Figure 7) and said stylus must again be returned to zero position which would be the beginning of the fourth stage, representing 150° F. At this point the manual switches 44, 49 and 50 are again actuated to connect the next resistances 42c and 45c, respectively, in the circuits. Connection of the resistance 42c to the leg 34 of the Wheatstone bridge circuit again balances out this circuit and returns the stylus to zero position. The connection of the resistance 45c into the bridge circuit applies a predetermined voltage so as to compensate for the different voltage drop which will occur during the fourth scale of operation.

As has been explained, as the temperature varied from 50° F. to 100° F. with a predetermined voltage on the bridge, during the second stage of operation, the change in the electrical resistance of the thermistor resulted in a five volt differential across the bridge. The change from 100° F. to 150° F. in the temperature acting upon the thermistor 21 during the third stage and with a new applied voltage, resulted in a maintenance of the five volt differential to set the top limit of movement of the stylus in this scale; in the fourth range from 150° F. to 200° F., the electrical resistance of the thermistor will be varied to cause a different voltage drop across the bridge circuit during this range, and in order to maintain the five volt differential being applied to the vacuum tube voltmeter, the resistance 45c is of such value that the predetermined voltage required to maintain said five volt differential is applied to the bridge circuit. Thus, with the voltage dividing network 38 it is possible to always maintain the top limit of differential applied to the vacuum tube voltmeter so that the stylus will always stop at the right hand edge of the chart (Figure 7) upon reaching the top temperature in any particular stage of the operating range. It is evident that as the temperature encountered by the thermistor rises and the top point in each scale is reached, the switches 44, 49 and 50 are manually actuated to move the unit into the next scale of said range.

By dividing the operating range into a plurality of stages or scales, it is apparent that an amplified or exaggerated indication of the temperature may be obtained. In other words, instead of the width of the chart being utilized to indicate from 0° F. to 350° F., the width of said chart is representative of one stage or scale which is representative of a 50° F. temperature range. This makes it possible to more accurately determine and indicate minute temperature changes. It will be apparent that as the thermistor 21 is moved downwardly through the well bore, the temperatures encountered thereby are measured and continuously indicated at the surface. The chart 15 will, of course, be moved by a timing motor (not shown) or other timing device so that the length of said chart may be properly calibrated to represent distance. After the thermistor has traversed the well bore completely to the bottom of the same, a continuous chart of the well temperature variations occurring throughout said well bore has been obtained. As has been stated the physical construction of the thermistor is subject to some variation and so long as it is exposed to the well bore temperature, the purposes of the invention may be accomplished.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A temperature measuring and recording apparatus including, an electrical temperature measuring circuit comprising a Wheatstone bridge, a fixed resistance in each of two legs of the bridge, a temperature responsive element adapted to be lowered within a well bore and electrically connected in third leg of the bridge circuit whereby the temperature changes affecting the temperature responsive element produce variations in said bridge circuit, a recording mechanism including a chart and a recording stylus movable transversely across said chart, electrical actuating means for imparting movement to the stylus means for electrically connecting said stylus actuating means with the bridge circuit whereby the variations in said circuit which are representative of the temperature changes affecting the temperature responsive element are utilized to actuate the stylus to visibly record said temperature changes on said chart, a plurality of electrical resistances each of a predetermined value different from the value of the others, each resistance being representative of a stage or scale within the operating range, means for selectively connecting the desired resistance in the fourth leg of the bridge circuit whereby said resistance electrically balances said circuit and thereby returns the recording stylus to its starting position relative to the chart, said resistance thereby controlling the starting point in the stage or scale, and a voltage dividing network electrically connected across the bridge circuit for setting the upper limits of each scale and also for controlling the movement of the stylus to assure its complete travel across the chart during each scale within the operating range.

2. A temperature measuring and recording apparatus including, an electrical temperature measuring circuit comprising a Wheatstone bridge circuit, a fixed resistance in each of two of the legs of said bridge, a measuring unit adapted to be lowered within a well bore and having a temperature responsive element electrically connected in the third leg of the Wheatstone bridge circuit whereby the temperature changes affecting the temperature responsive element produce variations in the bridge circuit, a recording mechanism having a chart and a recording stylus movable transversely across said chart, electrical actuating means for imparting movement to the stylus, an electrical operating means electrically connected with the bridge circuit and actuated by the voltage differential across the bridge circuit, means for electrically connecting said operating means with the stylus-actuating means whereby the recording stylus is actuated in accordance with the voltage differential across the measuring circuit as produced by the temperature changes acting upon the bridge unit, to visibly record said temperature changes on said chart, a variable resistance assembly connected in the fourth leg of the Wheatstone bridge circuit for electrically balancing the bridge circuit at predetermined points in the operating range to divide said operating range into a plurality of stages, and electrical means comprising a voltage dividing network connected in the bridge circuit for controlling the voltage applied to the bridge circuit whereby the stylus is controlled to assure the same movement of the stylus relative to the chart per degree of temperature change throughout the entire operating range of the apparatus, said variable resistance assembly and voltage dividing network being adjusted in accordance with each other whereby the control of voltage is in accordance with the particular stage of operation within the operating range.

3. A temperature measuring and recording apparatus including, an electrical temperature measuring circuit comprising a Wheatstone bridge circuit, a fixed resistance in each of two legs of said bridge, a temperature responsive element adapted to be lowered within a well bore and electrically connected in the third leg of the bridge circuit whereby the temperature changes affecting the temperature responsive element produce variations in the bridge circuit, a recording mechanism including a chart and a recording stylus movable transversely across said chart, a vacuum tube voltmeter electrically connected to the bridge circuit and actuated by the variations in the circuit as caused by the temperature changes affecting the temperature responsive element, means for electrically connecting said stylus with the voltmeter whereby actuation of the voltmeter as controlled by the variations in said circuit which are representative of the temperature changes affecting the temperature responsive element controls operation of the stylus to visibly record said temperature changes on said chart, a variable resistance assembly connected in the fourth leg of the Wheatstone bridge circuit and comprising a series of electrical resistances of predetermined values each of which is representative of an operating stage within the overall operating range of the bridge, means for electrically and selectively connecting one of said resistances in the bridge circuit to electrically balance said circuit at a desired or predetermined time, whereby the recording stylus is returned to starting position with respect to its chart at such predetermined time, and a voltage dividing network comprising a second series of electrical resistances adapted to be selectively and electrically connected between the power source and the bridge circuit for controlling the voltage differential occurring across the bridge circuit, and means for operating the variable resistance assembly and the voltage dividing network in relationship to each other whereby the control of the voltage differential across the bridge circuit is in accordance with the selected stage within the operating range and within which the apparatus is operating.

RALPH W. GOBLE.

References Cited in the file of this patent

UNITED STATES PATENTS

| Number | Name | Date |
|---|---|---|
| 955,191 | Northrup et al. | Apr. 19, 1910 |
| 1,593,024 | Macadie | July 20, 1926 |
| 1,961,965 | Fisher | June 5, 1934 |
| 2,050,128 | Schlumberger | Aug. 4, 1936 |
| 2,191,765 | Lohman | Feb. 27, 1940 |
| 2,277,427 | Woodson | Mar. 24, 1942 |
| 2,316,942 | Doll | Apr. 20, 1943 |
| 2,365,706 | Keinath | Dec. 26, 1944 |
| 2,455,520 | Prudhon et al. | Dec. 7, 1948 |
| 2,517,455 | Waters | Aug. 1, 1950 |